Patented Oct. 24, 1939

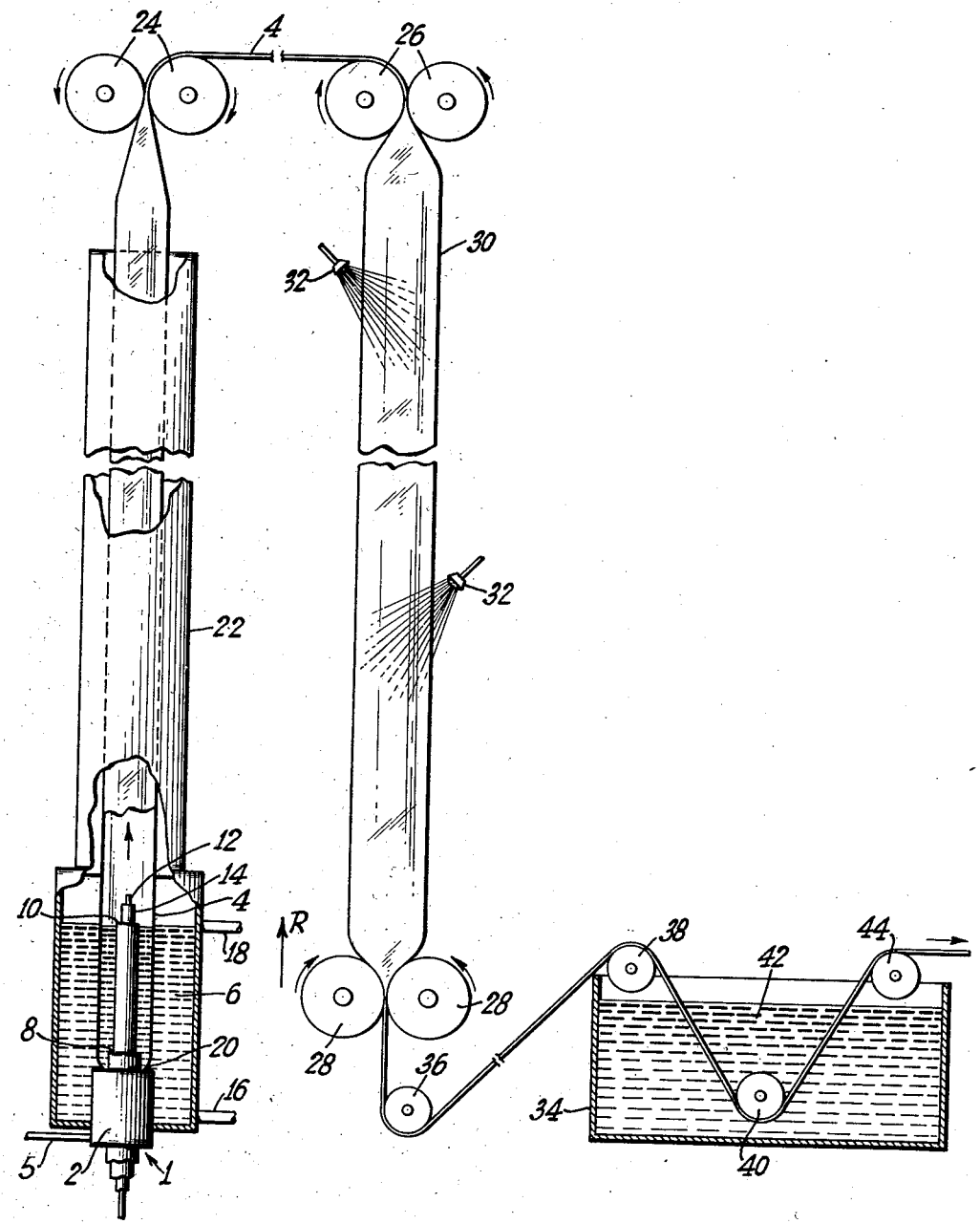

2,176,925

UNITED STATES PATENT OFFICE 2,176,925

PROCESS FOR MAKING TUBING AND PRODUCT SO PRODUCED

Frank H. Reichel and Augustus E. Craver, Fredericksburg, Va., assignors to Sylvania Industrial Corporation, Fredericksburg, Va., a corporation of Virginia Application March 15, 1939, Serial No. 261,872

16 Claims. (Cl. 18—57)

The present invention relates in general to flexible tubing. More particularly, it relates to flexible tubing of a type capable of use as artificial sausage casings, and to a process and apparatus for making such casings, and to correlated improvements designed to enhance the properties and increase the field of usefulness of such tubing.

In the meat packing industry and, more particularly in the sausage making field, there has always been present the serious problem of obtaining casings which were uniform as to size, expansibility, tensile strength, shape, appearance, etc.

An artificial casing composed of cellulose hydrate regenerated from viscose in the usual way and not treated in accordance with the present invention has been proposed as a solution to the problem at hand. It has been found, however, that the problem was only partially solved as the cellulose casings also varied with respect to tensile strength as well as expansibility. While the meat packers were provided with artificial casings of uniform initial size and shape, these factors did not remain uniform under conditions of stuffing, cooking, smoking, ageing, storing, handling, etc. For example, during stuffing the prior casing would burst due to its low transverse tensile strength, or it would be transversely expanded at a non-uniform rate and would unduly elongate during subsequent treatments as well as shrink inadequately and thereby result in a product varying both in shape and weight and being unsightly in appearance.

Accordingly, a general object of the invention is to provide artificial sausage casings adapted to produce a sausage which can be made substantially uniform in weight and shape and which has predetermined stretch, strength and shrinkage characteristics. In particular, it is an object of the invention to produce from nitrocellulose a casing composed essentially of cellulose hydrate which has new and superior properties as compared to casings made by prior processes.

Another object of the invention is to provide a seamless flexible non-fibrous cellulosic tubing having a longitudinal and transverse tensile strength greater than that heretofore obtained in such tubing, and a process for making such tubing.

A further object of the invention is to provide a process of producing artificial sausage casings by which the degree of stretch in the completed casing can be accurately controlled and predetermined both longitudinally and transversely.

Another object of the invention is to provide a process of producing artificial sausage casings by which the degree of shrinkage in the finished casing can be accurately controlled and predetermined both longitudinally and transversely.

A further object of the invention is to provide an artificial sausage casing consisting primarily of cellulose hydrate which is substantially non-extensible longitudinally under ordinary sausage making operations.

Another object of the invention is to provide a flexible tubing capable of use as an artificial sausage casing which will retain a substantially constant length during stuffing, cooking and curing operations, but which can be expanded transversely to a large extent during the same operations without bursting or assuming a wrinkled or loose apearance after stuffing and cooking.

A still further object of the invention is to provide a process of continuously producing from non-fibrous cellulosic material a seamless tubing having a longitudinal and transverse tensile strength greater than that heretofore obtained in such tubing.

A further object of the invention is to provide a process for producing from non-fibrous cellulosic material an artificial sausage casing having an increased tensile strength and a limited degree of stretch both longitudinally and transversely thereof.

Another object of the invention is to provide an apparatus for producing in a continuous manner flexible tubing capable of use as artificial sausage casings and which has predetermined characteristics in regard to strength, stretchability and shrinkability in longitudinal and transverse directions.

Other objects of the invention will in part be obvious and will in part appear hereinafter.

The process of the invention comprises, in general, continuously shaping a tubing from a cellulose derivative dispersed in a suitable dispersion medium, hardening or coagulating the tubing sufficiently to render it capable of retaining its tubular shape during subsequent treatment, conditioning the tubing for stretching either simultaneously with the coagulating operation or subsequently thereto, thereafter stretching the conditioned tubing longitudinally and transversely in a continuous manner, preferably while the tubing is in the wet gel state, and, with or without releasing the stretching tension, fixing the micellar structure of the tubing material in the condition caused by stretching as by converting the cellulose derivative partially or completely to cellulose hydrate, after which the tubing may be purified, plasticized and dried in a known manner.

The article of the invention comprises a seamless tubing composed primarily of cellulose hydrate and adapted for many uses in particular for use as a sausage casing. The tubing is characterized by having an increased tensile strength and predetermined definite stretch and shrinkage characteristics both longitudinally and transversely.

The apparatus of the invention comprises means for shaping a hardenable plastic cellulosic material into a seamless tubing, means for simultaneously coagulating the material and conditioning it for stretching, means for applying a predetermined degree of stretch to the tubing in transverse and longitudinal directions, and means for fixing the structure of the tubing material in the condition caused by the stretching.

The invention accordingly comprises the process having the several steps and the relation of one or more of such steps with respect to each of the others, the apparatus embodying features of construction, combinations and arrangement of parts adapted to effect such steps, and the article which possesses the characteristics, properties and relation of elements, all as exemplified in the detailed disclosure hereinafter set forth and the scope of the invention will be indicated in the claims.

The tube-forming material employed in the process of the invention may comprise any suitable film-forming cellulose derivative, such as cellulose esters, for example, cellulose nitrate, cellulose acetate, cellulose formate, cellulose butyrate, etc.; cellulose xanthates and cellulose ether-xanthates; cellulose thiourethanes; cellulose xantho-fatty acids and other water-swelling cellulose derivatives such as the alkali-soluble cellulose ethers and the glycollic acid ethers of cellulose and their salts, all of which cellulose derivatives are capable of being converted to cellulose hydrate or of being converted to a derivative of lower degree of substitution or a different derivative by well known treatments, such as saponification, deesterification, deetherification, decomposition and the like. While any of the aforementioned cellulose derivatives may be employed in the invention, it is preferable and highly advantageous from certain aspects of the invention to use cellulose nitrate in making the tubing.

The cellulose derivative may be dispersed in suitable liquid dispersion media, having regard for the particular solubility characteristics of the cellulose derivative and the method of use. The term "dispersion of the cellulose derivative", and similar terms as used throughout this specification and the claims, is to be understood as meaning all dispositions of the cellulose derivative in dispersion media, including true solutions, suspensions, etc. The dispersion media may comprise true solvents, alone or in admixture with non-solvent diluents.

The dispersion of the cellulose derivative is shaped in the form of a seamless tubing by any suitable means and preferably by extruding the dispersion through an orifice.

The shaped tubing is hardened to the gell state and rendered shape-retaining by use of a suitable gaseous or liquid coagulant and/or by heat, having regard for the nature of the cellulose derivative. For example, the liquid coagulant may be one which coagulates by extraction of the dispersion medium. When cellulose nitrate is the material from which the tubing is shaped, it may be precipitated from its solution in organic solvents by the use of water or alcohol or a mixture of the two as an extraction agent. Preferably the coagulant should be applied on both the inside and the outside of the tubing during formation. By way of example, the tubing, simultaneously with its formation, may be sprayed with liquid coagulant or an extrusion orifice may be used to shape the tubing and may be disposed beneath the surface of a liquid coagulant. When employing cellulose xanthate as the cellulose derivative, the coagulant should be of such type as to set the tubing in a shape-retaining gel state without completely decomposing the cellulose xanthate to cellulose hydrate; a suitable coagulant, for example, being ammonium sulphate and the conditioning agent being water or an aqueous alcohol solution. Other well known coagulants of the same type may be used.

Stretching of the tubing in accordance with the present invention takes place at a particular point in its production. That is, the stretching takes place subsequent to coagulation of the shaped tubing and prior to the fixation of the micellar structure in the condition caused by stretching as by conversion of the cellulose derivative as previously described. Such stretching as has been imparted to cellulose tubing during its manufacture in prior art processes has been limited to stretching during the shaping operations and incidental to passage of the tubing through the apparatus and prior to or during coagulation as, for example, described in United States Patent No. 2,070,247. Stretching prior to substantially complete coagulation as heretofore proposed will not produce the results which flow from the present invention.

It has been found that tubing containing a substantial amount of the dispersion medium in the form of an active solvent for the material from which the tubing was formed has substantially no "nerve" or toughness and is so soft as to be incapable of being stretched to the amount necessary to attain the objects of the present invention. The discovery has been made that this disadvantage may be overcome by properly conditioning the tubing prior to stretching. The tubing is conditioned by substantially removing the active solvent and replacing it by an agent which diffuses throughout the tubing material and prevents it from contracting. In this condition the cellulosic material carries a considerable amount of coagulant such as water and/or alcohol as well as traces of residual solvent, for example, ether. The conditioning agent is selected with regard to the nature of the tubing material and always there is employed an agent which is not a solvent or softener for the cellulosic material, and preferably there is employed a conditioning agent which is miscible with the residual solvent in the tubing. When the residual solvent is miscible with the conditioning agent the latter is readily disseminated uniformly throughout the walls of the tubing and a tubing so treated while or until it is in the gel state is toughened and simultaneously rendered capable of stretching uniformly in all directions.

The conditioning agent may be a substance which is not a solvent for the cellulose derivative or a substance which is normally a solvent for the cellulose derivative in admixture with a suitable non-solvent diluent in such proportions that the mixture will condition but not dissolve the cellulose derivative. For example, when the cellulose derivative is nitrocellulose, suitable non-solvent conditioning agents are ethyl alcohol, diethylene glycol, butyl alcohol and the like, or the conditioning agents may be active nitrocellulose solvents such as methyl alcohol, acetone, butyl acetate and the like, in admixture with a suitable non-solvent diluent such as water, glycerin, ethylene glycol and the like in such proportions that the mixture will condition but not dissolve the nitrocellulose.

The conditioning agent may be applied to the tubing by means of a separate treatment to which the tubing is subjected after it passes from the coagulating bath, but in the preferred form of the invention the conditioning agent and coagulating agent are employed in the same bath. It is advantageous to slowly circulate the coagulating and conditioning liquid in this instance. When the cellulose material is cellulose nitrate dispersed in an aqueous ether-alcohol solution and water is used as the coagulant and an aqueous solution of alcohol is used as the conditioning agent, the ether extracted from the cellulose nitrate solution can be substantially removed from the bath during circulation. For example, the circulating liquid may be passed through a suitable apparatus to remove the major portion of the ether by evaporation as well as any desired amount of alcohol necessary to keep the alcohol concentration in the bath substantially constant. In this manner, a separate treatment with the conditioning agent is dispensed with and the combined operation of coagulating and conditioning are accomplished in the same treatment.

When the same bath is used to coagulate and condition the tubing, the amount of conditioning substance present in the coagulating bath is sufficient to maintain the tubing material in uncontracted condition, as previously explained, so that the liquid in the tubing material, for example, water is retained and may be partly exuded during the stretching operation.

When the cellulosic material from which the tubing is made is a cellulose xanthate, it is particularly desirable that the operations of coagulating and conditioning take place in the same bath, since once the cellulose xanthate tubing has been dried down, it contracts and makes it practically impossible to recondition it by swelling it to the uncontracted condition that existed in the coagulating bath.

When the tubing material is nitrocellulose, however, instead of keeping a large amount of water in the material by applying the conditioning agent concurrently with coagulation, it is possible, although not preferable, to wash out the alcohol and even dry the tubing and still accomplish practically the same results during stretching as if the tubing had not been so dried, by treating the dried tubing with a swelling conditioning agent by a separate treatment prior to stretching. The concentration of the swelling agent in the latter situation, however, would necessarily be higher than when the conditioning agent is applied in the coagulating bath. For example, the concentration in the separate bath should be in the neighborhood of 90 per cent swelling agent, when methyl or ethyl alcohol is used, to about 10 per cent of water.

It will be understood that the preferred manner of coagulating and conditioning the cellulosic material will be influenced by the nature of the material. That is, the same substance may be used in a single bath to coagulate and condition.

Both longitudinal and transverse stretching of the conditioned tubing are effected in a continuous manner by subjecting successive portions of the tubing to tension as hereinafter described, the longitudinal and transverse stretching being effected simultaneously or in sequence. The longitudinal stretching is effected continuously by elongating the tubing after it has been rendered self-sustaining and conditioned, but preferably before drying and always before converting it. The transverse stretching may be carried out before converting by continuousy maintaining a pressure differential between the inside and outside of a portion of the length of the tubing while it is travelling continuously. The pressure differential may be effected by the use of vacuum outside the tubing and/or fluid pressure within the tubing, or by the use of a greater fluid pressure inside as compared to the outside. Transverse stretching is uniformly accomplished by exerting a fluid pressure within the tubing as by the use of air or other gas or by a column of liquid which is a non-solvent for the tubing material. The tubing may be stretched transversely, also by a continuously applied mechanical pressure.

From a practical standpoint, the maximum degree of longitudinal and transverse stretching will vary with the nature of the cellulose derivative used, the condition of the tubing material at the time of stretching and the thickness of the tubing wall. Moreover, at the higher degrees of stretch, the longitudinal and transverse stretch are dependent upon each other because as the tubing is stretched longitudinally it tends to shrink transversely and vice versa. By way of example, but not by way of limiting the invention the tubing may comprise about 30 per cent by weight of cellulose nitrate in a gel state, about 70 per cent of a conditioning agent comprising about 60 per cent alcohol, 38 per cent water and about 2 per cent residual solvent for the cellulose nitrate which in this case would be ether. The tubing may be stretched simultaneously during manufacture from zero to 60 per cent longitudinally of its initial unit length and 100 to zero per cent transversely, based upon the initial size of the tubing.

The expression "gel state", as used herein, is intended to cover an uncontracted product containing a conditioning agent in excess of the maximum which would normally be present in the commercially dry product.

It has been found that the characteristics of the finished tubing are dependent upon the amount of stretching, both longitudinally and transversely, which it undergoes during treatment. It is therefore possible to accurately predetermine and control the longitudinal and transverse tensile strength of the finished tubing and the amount which it will stretch, both longitudinally and transversely, before breaking, as well as the amount which it will shrink in both of these directions, by varying in a regulated manner the amount of transverse and longitudinal stretch which the tubing undergoes during treatment in accordance with the present invention. The tubing in finished form can be caused to have substantially equal stretch in transverse and longitudinal directions. That is, it may be made to have from practically no stretch in either direction during stuffing operations and therefore in wet condition up to in the neighborhood of 72 per cent stretch in both directions, or its stretch may be limited to a minimum in one direction and raised to a maximum in the other direction, for example, in the neighborhood of 150 per cent transverse stretch while the longitudinal dimension remains substantially constant.

It is therefore possible to form flexible tubing which is adapted for use under many different conditions. For example, an artificial sausage casing can be made which during stuffing, and therefore in the wet state, will remain substantially of a constant length or even shrink longitudinally while expanding transversely any amount up to about 150 per cent. This means that the sausage stuffing machine operator is given considerable latitude in the finished size of the sausage desired. A casing of a given initial size may be expanded sufficiently to form casings of several different stuffed sizes instead of employing casings of different initial sizes, as was required with artificial casings heretofore available. In addition to providing greater latitude in the sizes of finished sausages which may be made from a casing of a given size, the sausages will not be distended longitudinally when hung on racks following stuffing and during smoking and cooking operations, and are thereby enabled to retain their shape during such operations instead of bagging at the bottom and forming somewhat pear-shaped sausages as has been a common defect in denitrated nitrocellulose casings heretofore available.

The longitudinal and transverse stretching of the tubing may be accomplished with the apparatus disclosed in the co-pending application of Frank H. Reichel, Augustus E. Craver and Arthur O. Russell, filed February 19, 1938, Serial No. 191,414 and entitled Process and apparatus for making tubing.

A preferred form of apparatus for carrying out the process of the present invention is illustrated in the accompanying drawing. The apparatus comprises an extrusion head 1 which is of a well known type and for this reason has not been illustrated in detail. The extrusion head comprises a body 2 provided with a suitable orifice from which plastic material supplied from any suitable source through the pipe 5 is extruded in the form of a tubing 4. As the tubing issues from the nozzle it passes up through a bath 6 which comprises a coagulant for the tubing material which hardens the material sufficiently to enable it to retain its tubular shape during subsequent handling. The same coagulating liquid as that contained in the bath 6 is supplied to the interior of the tubing by a pipe 8 and is withdrawn by means of the pipe 10. Air under a low pressure is supplied to the interior of the tubing by means of pipe 12 and is withdrawn by means of pipe 14. The function of the air is to keep the tubing distended so that its shape will be preserved but substantially without stretching it.

The liquid of the bath 6 not only serves as a coagulant for the tubing, but is of such a nature as to condition the tubing for stretching as has been previously described. The liquid of bath 6 is preferably slowly circulated by means of pipes 16 and 18 which lead to and from, respectively a suitable type of circulating apparatus which preferably contains any suitable means for evaporating the solvent for the cellulosic material which is extracted in the coagulating and conditioning bath. The latter means may be in the nature of a fractional distillation apparatus or other well known type of evaporation apparatus.

It is also desirable that the temperature of the circulating liquid be controlled as previously described and the same means that removes the solvent or any desired additional heating means may be provided for maintaining the circulating liquid substantially at the desired temperature.

When the tubing emerges from the orifice, it is only slightly coagulated and therefore invariably undergoes a slight amount of stretching which causes the tubing to expand as shown at 20. The stretching at this point as part of the shaping, however, has no relation to the present invention since the tubing material is not in condition at that time to have its strength and stretchability characteristics affected and predetermined by being stretched after shaping and complete coagulation in accordance with the present invention.

The tubing is led upwardly through a jacket 22 which has been shown as being partly broken away for the purpose of explanation and any vapors, such as alcohol and ether vapors, may be recovered from this casing by any well known form of recovery apparatus.

The substantially completely coagulated tubing is passed upwardly between a pair of positively driven squeeze rollers 24. These rollers are urged together by any suitable means so as to collapse the tubing and hold the walls sufficiently tightly together to prevent the passage of air between the rollers with the tubing. These rollers are driven so as to have a circumferential speed substantially equal to the speed of extrusion of the plastic material from the nozzle tube.

The flattened casing 4 is then passed between a pair of squeeze rollers 26 which are also urged together by any suitable means sufficiently to maintain the casing walls in contact and prevent leakage of air therebetween when a substantial air pressure is placed within the tubing beyond the squeeze rollers 26. Means may be provided for raising or lowering one of the pairs of rollers to thus vary the internal pressure so as to compensate for changes in the quantity of gas entrapped between the pairs of rollers.

From the squeeze rollers 26, the casing is fed between another pair of squeeze rollers 28 which are also urged together under sufficient pressure to maintain the tubing walls collapsed when there is a substantial air pressure in the tubing ahead of the rollers. Prior to the time the tubing is passed between the rollers 28, air pressure from any suitable source is introduced into the end of the tubing until the tubing is expanded to the amount necessary to give the desired flat width of the tubing in collapsed state after it passes the rollers 28. When the tubing has been expanded the desired amount, its end is passed between the rollers 28 and the tubing is maintained in an expanded and stretched condition as shown at 30 between the pairs of squeeze rollers 26 and 28.

The tubing may be stretched longitudinally simultaneously with transverse stretching by positively driving the squeeze rollers 28 at a greater circumferential speed than the pair of squeeze rollers 26. If desired, the tubing may be stretched longitudinally either previously or subsequently to the time that it is stretched transversely. For example, the squeeze rollers 26 may be driven at a greater circumferential speed than the squeeze rollers 24 so that the run of casing between these pairs of rollers is longitudinally stretched at that time.

The expanded casing between the squeeze rollers 26 and 28 may be advantageously washed to remove the conditioning liquid by spraying the casing at this point with water by means of water sprays 32.

From the squeeze rollers 28 the tubing may be suitably rolled on reels for subsequent treatment or it may be passed to a dryer of any well known type and then rolled up for subsequent treatment, or it may be passed directly to any suitable washing bath or baths (not shown) and thence to a converting bath 34 by being passed over idler rollers 36 and 38. The tubing passes under a suitable roller 40 submerged beneath the liquid 42 in the converting bath and is then passed out of the bath over the roller 44 from which it is suitably conveyed through purifying, drying and plasticizing treatments in accordance with well known practices in the industry. The specific converting liquid used in bath 42 will be dependent upon the nature of the cellulosic material of the tubing as will be explained later.

When employing thermoplastic tube-forming materials, it has been found that the stretching operations may be facilitated by the application of heat which renders the material more plastic. The degree of stretch under a constant force will be dependent upon the plasticity of the tubing which, in turn, is dependent upon its temperature. From this, it may be seen that the degree of stretch may be varied as desired merely by controlling the temperature in the region where stretching takes place. The use of heat to render the tubing plastic is particularly beneficial in that it permits the use of a lower pressure differential between the inside and outside of the tubing, the attainment of a more uniform expansion and an expansion to a higher degree. Moreover, during continuous transverse stretching when an internal liquid column is used, the tubing carries with it a certain amount of liquid from the column thereby causing a gradual decrease in the expanding force. This decrease in the height of the column may be compensated by a gradual increase of the heat supplied to the zone of expansion and/or by increasing the height of the liquid column as hereinbefore described.

After the tubing has been stretched longitudinally and/or transversely to the desired amount, the conditioning agent is preferably partly or completely removed preferably while the tubing is in its elongated and/or expanded condition, after which treatment the stretching tension may be released. Thereafter, the tubing may be washed, plasticized or otherwise finished and, finally, converted to cellulose hydrate, which conversion fixes the new tensile, stretch and shrinkage characteristics of the product. Thus the new micellar structure produced by stretching is fixed and rendered substantially permanent, as by converting the cellulose derivative to cellulose hydrate.

The cellulose derivative may be converted partly or completely to cellulose hydrate in a known manner as by treating the tubing with a suitable reagent to deesterify, reduce or decompose the cellulose derivative and replace the substituent by an hydroxyl radical, having regard for the nature of the cellulose derivative. Such conversion may be accomplished by suitable chemical changes known to those skilled in the art. For example, cellulose xanthate may be decomposed to cellulose hydrate by means of heat or a strong mineral acid. Cellulose esters may be converted to cellulose hydrate by suitable deesterification, such as by saponification with a strong alkali, or, by use of a reducing agent such as an alkali hydrosulphide. In the appended claims, the expression "converting" is used generically to include all reactions by which a cellulose derivative may be changed to cellulose hydrate or to a derivative of lower degree of substitution or to a different cellulose derivative.

The conversion reaction is preferably carried out while the tubing is in the gel state and while the tubing material is in the condition produced by the stretching operation or operations. It has been found that when the micelles in the cellulose derivative gel are rearranged by stretching of the gel, the conversion of the cellulose derivative serves to fix the micelles in their new arrangement, that is, to fix the condition of the tubing material caused by stretching so that the tubing does not return to its original characteristics. Although it is believed that this is the proper explanation of the results obtained by stretching the tubing between substantially complete coagulation and conversion, it is to be understood that the invention is not dependent upon this theory.

To further fix and set the tubing in condition caused by stretching, the tubing is changed from the wet gel state to a dry gel state, for example, by evaporation of any residual solvent and conditioning agent, or by passing the stretched tubing through a suitable bath containing a liquid which is not a swelling agent and which will extract any residual solvent. Where heat has been employed to condition and/or for stretching the tubing, the stretched structure may be fixed by chilling the tubing, for example, by passing it through a bath of cold water or through a stream of cold air or the like.

The converted tubing may be purified and finished in any desired manner, for example, by subjecting it to suitable baths for washing, bleaching, dyeing, plasticizing, preserving, etc., and the purified and treated tubing may then be dried in any suitable manner.

By way of illustrating, but not by way of limiting the invention, there will be given the following example:

To prepare an artificial sausage casing, 20 kilograms of nitrocellulose having a nitrogen content of 11.9 per cent are immersed and agitated in 80 kilograms of a solvent consisting of, by weight, 60 parts of alcohol and 20 parts of ether until a substantially homogeneous mass is obtained. The condition of the manufacture of the nitrocellulose should be such that the solution thus produced has a high viscosity. This solution is extruded through the nozzle directly into a combined coagulating and conditioning bath which may consist of, for example, 55 per cent of water, 40 per cent of alcohol and 5 per cent of ether, wherein the nitrocellulose is substantially completely coagulated. Coagulating liquid comprising a similar solution is introduced interiorly of the tube.

The temperature of the coagulated tubing and conditioning bath may be varied between 20° C. and 50° C. and is preferably maintained in the neighborhood of 36° C. in the manner previously explained.

The tubing is then stretched longitudinally from zero per cent to 60 per cent and stretched transversely from 54 per cent to zero per cent of its original diameter. After the tubing has been stretched, it is preferably again washed, with or without first releasing the stretching tension, and then passed through a denitrating bath comprising, for example, a 5 per cent aqueous solution of sodium hydrosulphide, the traverse being sufficient to reduce the nitrogen content of the tubing to a very small amount, for example, 0.5 per cent. The tubing so denitrated may then be washed and softened with a suitable plasticizer such, for example, as a 20 per cent aqueous solution of glycerine.

The expression "original length" and "original diameter" as used throughout this application designate the length of a given unit of the freshly coagulated tubing and the "flat diameter" of the tubing designates the width of the tubing when collapsed and in a flat condition, respectively. Both of these dimensions refer to the coagulated tubing in the gel state and prior to stretching. Wherever the term "diameter" is used throughout this application, it refers to the diameter of the tubing in a flattened condition.

In the following table there is given the comparative characteristics of three tubings made from cellulosic materials. The first tubing A was made from viscose regenerated to cellulose hydrate in the usual manner without being subjected to stretching, other than that normally inherent in such a process as previously explained, and not stretched after coagulation of the viscose but before regeneration to cellulose hydrate in accordance with the present invention. The tubing B was made from nitrocellulose which was denitrated in the manner previously explained, but also without being subjected to stretching other than that inherent in the normal forming operation. The tubing C was also made from nitrocellulose, but was stretched transversely and longitudinally as indicated in the table between substantially complete coagulation of the nitrocellulose and denitration in accordance with the present invention.

|  | A | B | C |
|---|---|---|---|
| Longitudinal stretch during manufacture percent.. | 0 | 0 | 35 |
| Transverse stretch during manufacture percent.. | 0 | 0 | 13 |
| Finished tubing (wet): | | | |
| Wall thickness............inches.. | 0.0073 | 0.0064 | 0.0068 |
| Longitudinal strength......grams.. | 6625 | 4300 | 11,438 |
| Transverse strength..........do.... | 3675 | 4838 | 6375 |
| Bursting strength........pounds.. | 3 | 2.5 | 3.875 |
| Elongation increase at bursting point per cent.. | 6 | 27 | 0 |
| Inflation increase at bursting point per cent.. | 89 | 78 | 76 |

From this table it is apparent that tubing stretched in accordance with the invention exhibits new and valuable properties over those of a tubing not stretched in accordance with the invention. Although all three of these tubings were of substantially the same wall thickness when wet preparatory to stuffing, the longitudinal and transverse strength of the stretched tubing C are both much greater than either of the two unstretched tubings A and B. This shows that a tubing stretched in accordance with the present invention can be given predetermined strength characteristics far superior to the strength characteristics of a tubing not treated in accordance with the present invention. The bursting strength of the stretched tubing C is greater than the bursting strength of either of the two unstretched tubings and its elongation increase at the point of bursting remains zero whereas its inflation increase or transverse stretch during stuffing was nearly as great as in the case of the unstretched tubings. This means that tubing C would not be undesirably elongated during stuffing and also subsequent to stuffing and during cooking and curing as would the other two tubings with the result that the sausage made with a casing formed of tubing C would retain its desired shape and would not expand at the bottom and form a pear-shaped sausage as has been so frequently the case with prior art artificial sausage casings.

It has been discovered that when a tubing is stretched more in one direction than in the other, it is stronger in that direction than in the other and stretches and shrinks less than in the other direction. By properly proportioning the amount of longitudinal stretch to the amount of transverse stretch imparted to a tubing between the steps of complete coagulation and conversion, it is possible to predetermine the characteristics of the finished tubing in regard to strength, stretching and shrinkage, both longitudinally and transversely. In the following table there are given the results of varying the ratio between the amount of longitudinal stretch and the amount of transverse stretch imparted to a tubing between the steps of substantially complete coagulation and conversion.

|  | D | E | F |
|---|---|---|---|
|  | Per cent | Per cent | Per cent |
| Longitudinal stretch during manufacture.... | 0 | 42 | 60 |
| Transverse stretch during manufacture.... | 54 | 41 | 0 |
| Finished tubing (wet): | | | |
| Longitudinal stretch........... | 69 | 36 | 21 |
| Transverse stretch............. | 49 | 77 | 251 |
| Longitudinal shrinkage......... | 32 | 13.2 | 0.9 |
| Transverse shrinkage........... | 8 | 25.2 | 36 |
| Elongation increase at bursting point...................... | 38.4 | 15 | −19.3 |
| Inflation increase at bursting point...................... | 28 | 48 | 140 |

From this table, it can be seen that the tubing D was not stretched at all longitudinally, but was stretched 54 per cent transversely with the result that the finished tubing in wet condition and under stuffing conditions stretched 69 per cent longitudinally and 49 per cent transversely. The same tubing during stuffing operations elongated 38.4 per cent and increased transversely or underwent an inflation increase of 28 per cent before bursting. On the other hand, tubing F which was stretched 60 per cent longitudinally and not at all transversely, stretched longitudinally while in the wet state and preparatory to stuffing less than one-third as much as tubing D, over five times as much transversely as tubing D, underwent about one-thirtieth as much longitudinal shrinkage between the wet state and the bone dry state and underwent almost five times as much transverse shrinkage as the tubing D under the same conditions. During the stuffing operation, the tubing F actually shrunk longitudinally whereas the tubing D stretched over 38 per cent and underwent an inflation increase of five times as much as the tubing D. Between these two extreme situations, the tubing E was stretched about the same amount longitudinally and transversely and the other characteristics fall in between the characteristics of tubings D and F.

It can be seen from this table that a finished tubing having substantially any desired strength and shrinkage characteristics within the limits of the material can be produced by suitably proportioning the ratio of the amount of longitudinal stretch to the amount of transverse stretch imparted to the tubing at the proper point in its manufacture. This enables a tubing to be produced which is vastly superior to prior art tubing since not only is there an economic saving because of the fact that a larger tubing can be produced at a cost which is very little more than that required to produce a casing of much smaller diameter according to the prior art processes, but tubings having definite characteristics can be supplied to the sausage manufacturing industry so that sausage stuffers can utilize one tubing to produce a number of different sized finished sausages and the sausages so made will be superior in quality to those previously produced. By properly predetermining the characteristics of the finished tubing, the tubing can be made to have the proper degree of stretch during stuffing so that the sausage stuffer will not be annoyed by repeated failures of the casing, the casing will not elongate during cooking, curing and other subsequent operations unless such is desired for any particular purpose, and the shrinkage characteristics of the tubing will be such that as the meat contracts during curing and drying, the casing will also shrink and contract with the meat so that a smooth and attractive product will be produced instead of the wrinkled and unsightly product which frequently resulted from the use of prior art casings in which the shrinkage factor was below that required.

It will be apparent from the foregoing that by suitably proportioning the amount of longitudinal stretch to the amount of transverse stretch imparted to a tubing in accordance with the present invention, the finished tubing can be made to have substantially identical characteristics in longitudinal and transverse directions.

While the present process has particular reference to the production of tubing adapted for use as sausage casing, it is to be understood that the tubing produced may be employed for other purposes, for example, as packaging materials for various types of food stuffs, such as meat products, ice cream, food pastes, also greases, industrial paste, tooth paste, etc.; as casings for candles, bottles and other solid objects, and when cut into short sections the tubing is adapted for use as bottle closure bands.

This application is a continuation in part of application Serial No. 191,413, filed February 19, 1938, in the name of Frank H. Reichel and Augustus E. Craver and entitled Process for making tubing and products so produced. Since certain changes in carrying out the above process and certain modifications in the article and the apparatus which embodied the invention may be made without departing from its scope, it is intended that all matter contained in the foregoing description or shown in the accompanying drawing shall be interpreted as illustrative and not in a limiting sense.

We claim:

1. The process of producing seamless tubing comprising extruding in the shape of a tubing a coagulable cellulose nitrate dispersed in a solvent comprising alcohol and ether into a coagulating and conditioning bath comprising alcohol and water, the concentration of alcohol in the bath being such that substantially all of the ether in the cellulose nitrate during coagulation is displaced by alcohol and water so that the cellulose nitrate is maintained in an uncontracted but completely coagulated condition applying internal pressure to said completely coagulated and conditioned cellulose nitrate tubing to stretch the same, and converting the cellulose nitrate in the state caused by stretching substantially to cellulose hydrate.

2. The process of producing tubing having predetermined strength, stretch and shrinkage characteristics comprising shaping a coagulable and convertible cellulose derivative material into the form of a tubing, completely coagulating the shaped material, stretching the completely coagulated cellulose derivative tubing longitudinally and applying internal pressure thereto to stretch the same transversely definite amounts in a ratio dependent upon the strength, stretch and shrinkage characteristics desired in the finished tubing and determined by the rule that when such a tubing after coagulation is stretched more in one direction than in the other direction, it will be stronger in that direction than in the other and stretches and shrinks less in that direction than in the other direction, and fixing the cellulosic material in the condition caused by the stretching.

3. The process of producing tubing having predetermined strength, stretch and shrinkage characteristics comprising shaping a coagulable and convertible cellulose derivative material into the form of a tubing, completely coagulating the shaped material and treating the material with a conditioning agent which establishes the material in an uncontracted condition, stretching the completely coagulated and conditioned tubing longitudinally and applying internal pressure thereto to stretch the same transversely definite amounts in a ratio dependent upon the strength, stretch and shrinkage characteristics desired in the finished tubing and determined by the rule that when such a tubing after coagulation is stretched more in one direction than in the other direction, it will be stronger in that direction than in the other and stretches and shrinks less in that direction than in the other direction, and fixing the tubing material in the condition caused by the stretching.

4. An artificial sausage casing comprising a converted cellulose derivative having a structure resulting from longitudinal stretching and transverse stretching by application of internal pressure of the cellulose derivative from which the casing was initially formed, subsequent to complete coagulation of the cellulose derivative incidental to forming the casing and prior to conversion.

5. An artificial sausage casing comprising partially denitrated cellulose nitrate having a structure resulting from longitudinal stretching and transverse stretching by application of internal pressure of the cellulose nitrate from which the casing was initially formed, subsequent to complete coagulation of the cellulose nitrate incidental to forming the casing and prior to partial denitration.

6. An artificial sausage casing comprising denitrated cellulose nitrate having a structure resulting from longitudinal stretching and transverse stretching by application of internal pressure of the cellulose nitrate from which the casing was initially formed, subsequent to complete coagulation of the cellulose nitrate incidental to forming the casing and while the cellulose nitrate was maintained in an uncontracted condition by an aqueous alcohol solution and prior to denitration of the cellulose nitrate.

7. The process of producing a tubing comprising shaping a dispersion of a coagulable and convertible cellulose derivative into the form of a tubing, completely coagulating said cellulose derivative tubing, thereafter applying internal pressure to said completely coagulated cellulose derivative tubing to stretch the same before conversion, and converting said cellulose derivative.

8. The process of producing a tubing comprising shaping a coagulable and convertible cellulose derivative dispersed in a dispersion medium into the form of a tubing, simultaneously completely coagulating said cellulose derivative tubing and substantially replacing the dispersion medium by a conditioning agent for the cellulose derivative, applying internal pressure to said completely coagulated cellulose derivative tubing to stretch the same before conversion, and converting said cellulose derivative.

9. The process of producing a tubing comprising shaping a coagulable and convertible cellulose derivative dispersed in a solvent into the form of a tubing, completely coagulating said cellulose derivative tubing, substantially replacing the solvent by a conditioning agent for said cellulose derivative, thereafter applying internal pressure to said completely coagulated cellulose derivative tubing to stretch the same, and converting said cellulose derivative.

10. The process of producing a tubing comprising continuously shaping a coagulable and convertible cellulose derivative into the form of a tubing, completely coagulating said cellulose derivative tubing, thereafter applying internal pressure to successive portions of said completely coagulated cellulose derivative tubing to continuously stretch the same transversely and applying positive tension to the cellulose derivative tubing to elongate the tubing before conversion, and converting the cellulose derivative.

11. The process of producing a tubing comprising shaping a coagulable and convertible cellulose derivative dispersed in a dispersion medium into the form of a tubing, completely coagulating said cellulose derivative tubing by means of a liquid comprising a coagulant and a conditioning agent for the cellulose derivative whereby the cellulose derivative is simultaneously coagulated and the dispersion medium is substantially replaced by the conditioning agent and applying internal pressure to said completely coagulated cellulose derivative tubing to stretch the same.

12. The process of producing an artificial sausage casing comprising shaping a coagulable and convertible cellulose derivative dispersed in a dispersion medium into the form of a tubing, completely coagulating said cellulose derivative tubing by means of a coagulant which is also a conditioning agent which substantially replaces the dispersion medium, thereafter applying internal pressure to said completely coagulated cellulose derivative tubing to stretch the same before conversion, and converting the cellulose derivative.

13. The process of producing an artificial sausage casing comprising shaping a coagulable and convertible cellulose derivative dispersed in a dispersion medium into the form of a casing, completely coagulating said cellulose derivative casing, thereafter treating said cellulose derivative casing with a swelling agent, stretching the completely coagulated cellulose derivative casing longitudinally and applying internal pressure thereto to stretch the same transversely before conversion, and converting said cellulose derivative.

14. The process of producing seamless tubing comprising extruding in the shape of a tubing a coagulable organic liquid soluble cellulose derivative dispersed in a liquid containing an organic solvent into a bath containing a coagulant for the cellulose derivative and a conditioning agent for the cellulose derivative which displaces a portion of said liquid and maintains the cellulose derivative in an uncontracted but completely coagulated state, thereafter applying internal pressure to said completely coagulated cellulose derivative tubing so formed and conditioned to stretch the same, and converting said cellulose derivative in the state caused by stretching.

15. The process of producing seamless tubing comprising extruding a viscose solution in the shape of a tubing into a bath comprising a coagulant for the viscose which does not convert the viscose to cellulose hydrate and a conditioning agent for the viscose which impregnates the same and maintains it in an uncontracted but completely coagulated condition, applying internal pressure to said completely coagulated viscose tubing so conditioned to stretch the same before conversion, and converting said viscose tubing in the state caused by stretching to cellulose hydrate.

16. The process of producing tubing comprising shaping a coagulable and convertible cellulose derivative into the form of a tubing, completely coagulating said cellulose derivative tubing, thereafter stretching said completely coagulated cellulose derivative tubing longitudinally and applying internal pressure thereto to stretch the same transversely, the preponderance of the stretching being applied in the direction in which it is desired that the tubing have the greater strength, and the lesser stretching being applied in the direction in which it is desired that the tubing have the greater ability to stretch and shrink, and converting said cellulose derivative.

FRANK H. REICHEL.
AUGUSTUS E. CRAVER.